Nov. 20, 1962     J. CASTAÑO MUÑOZ ETAL     3,064,660
DENTAL BRUSH
Filed Aug. 25, 1959
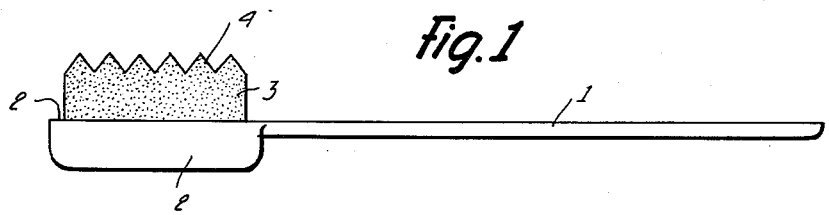
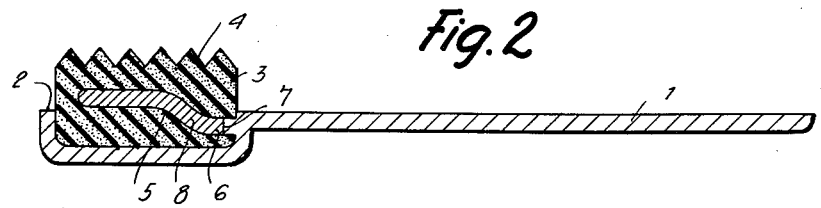
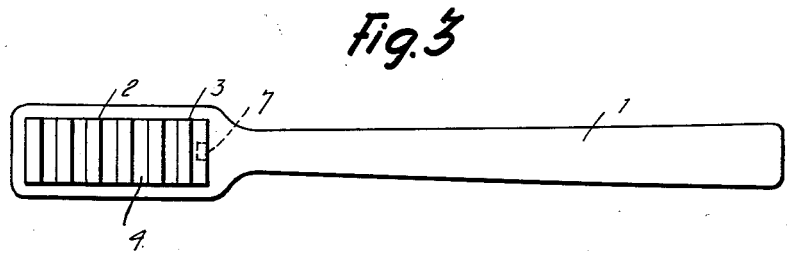

United States Patent Office 3,064,660
Patented Nov. 20, 1962

3,064,660
DENTAL BRUSH
José Castaño Muñoz, Calle Ricardo Calvo 2, and Emilio Serrano Montijano, Calle Laforja 80, Barcelona, Spain
Filed Aug. 25, 1959, Ser. No. 836,020
Claims priority, application Spain Sept. 6, 1958
4 Claims. (Cl. 132—84)

The present invention relates to a dental brush which, being of simple construction and ready manufacture, is particularly adapted for use as an advertising means in hotels, restaurants and the like.

The above brush consists of a handle, suitably shaped for its ready handling and formed at one end thereof with a concave housing wherein a body of foamy plastic is housed, the upper surface of this body being suitably profiled as to facilitate the action of rubbing. This foamy body has a cavity therein, formed with an opening which is covered by the lateral walls of the housing, wherein a supply of a suitable toothpaste is introduced.

For the better understanding of the present invention a sheet of drawings is enclosed showing, only by way of example, a practical embodiment of a brush incorporating the features of the invention.

In the said drawing: FIGURE 1 is a side, elevational view; FIGURE 2 is a longitudinal section corresponding to the zone of the internal cavity, and FIGURE 3 is a plan view.

The above brush is formed of a handle 1 suitably profiled for its ready handling, formed at one end thereof with a concave housing 2 of rectangular or any other conventional shape. The housing 2 has inserted therein and pressure or the like fastened, a body 3 of a general outline corresponding to that of the housing and made of a suitable porous foamy material, preferably a plastic material. The body 3 has the upper surface thereof 4 formed in a saw-tooth or any similar configuration, and has therein a cavity 5 the opening of which 6, is closed by one of the walls of the cavity 2, which in the particular embodiment illustrated is that adjacent to the handle.

The housing is formed at the wall thereof facing the opening 6 of the cavity 5, with a tenon 7 protruding from the said wall and fitting in the opening 6 for closure of same.

As it appears from the above description and the enclosed drawing, the handling of the described brush is as follows: The brush is held by the handle 1 and the foamy body 3 is applied onto the teeth in the suitable direction after the dentifrice has been supplied to the cavity. This dentifrice is located, as indicated by FIGURE 2, within the cavity 5 by introducing a refill 8 through the opening 6. Every replacement body is to be provided with the corresponding refill and once used it will be discarded, the support being ready to receive a fresh foamy body with a corresponding refill.

It will be understood that the materials used in the manufacture of the brush, as well as sizes, either absolute or relative, of the same will not alter the scope of the invention.

We claim:
1. A cleaning implement comprising, in combination, a handle having a forward end; an open housing provided at the forward end of said handle, said housing defining a recess and having a projection extending into said recess; and a block of elastic, manually compressible porous material received in the recess of and partly extending from said housing, said block having a cleaning face located externally of said housing, said block also formed with a dentifrice receiving cavity and having an opening for introduction of dentifrice into said cavity, said projection sealingly received in said opening whereby the dentifrice can be discharged only through the pores of said block when the cleaning implement is put to use, said projection retaining the block in the recess of said housing.

2. In a cleaning device, in combination, a body of elastic, manually compressible porous material formed in its interior with a cavity which terminates only in one opening located at an outer face of said body, the pores of said body being sufficiently large to provide movement of a cleaning substance in said cavity through the pores of the body to the exterior thereof upon compression of the body when said opening is closed so that the cleaning substance cannot escape through said opening; a receptacle open at one side and filled by said body, said body extending outwardly beyond said receptacle and said opening being located within said receptacle; and a projection fixed to said receptacle and extending through said opening into said cavity and closing said opening to prevent passage of the cleaning substance out of said body through said opening upon compression of said body and to releasably retain said body in said receptacle.

3. In a cleaning device, in combination, a body of elastic, manually compressible porous material formed in its interior with a cavity which terminates only in one opening located at an outer face of said body, the pores of said body being sufficiently large to provide movement of a cleaning substance in said cavity through the pores of the body to the exterior thereof upon compression of the body when said opening is closed so that the cleaning substance cannot escape through said opening; holding means having a recess open at one side and filled by said body, said body extending outwardly beyond said recess and said opening being located within said recess; and a projection integral with said holding means in said recess and extending through said opening into said cavity and closing said opening to prevent passage of the cleaning substance out of said body through said opening upon compression of said body and to releasably retain said body in said holding means.

4. In a tooth brush, in combination, a tooth cleaning body of elastic, manually compressible, porous material formed in its interior with a cavity which terminates only in one opening located at an outer face of said body, the pores of said body being sufficiently large to provide movement of a dentifrice or the like in said cavity through the pores of the body to the exterior thereof upon compression of the body when said opening is closed so that the dentifrice cannot escape through said opening; a receptacle open at one side and filled by said tooth cleaning body, said tooth cleaning body extending outwardly beyond said receptacle and said opening being located within said receptacle; a handle attached to said receptacle; and a projection coextensive with said handle extending through said opening into said cavity and closing said opening to prevent passage of dentifrice or the like out of said body through said opening upon compression of said body and to releasably retain said body in said receptacle.

References Cited in the file of this patent
UNITED STATES PATENTS

| | | |
|---|---|---|
| 1,165,394 | Leeuw | Dec. 28, 1915 |
| 1,248,675 | Kowinsky | Dec. 4, 1917 |
| 2,159,295 | Seifert | May 23, 1939 |
| 2,165,420 | Seifert | July 11, 1939 |
| 2,218,738 | Boysen | Oct. 22, 1940 |
| 2,674,000 | McDonald | Apr. 6, 1954 |